No. 672,453. Patented Apr. 23, 1901.
S. McGARVIN.
FRUIT GRADING MACHINE.
(Application filed May 3, 1900.)
(No Model.) 2 Sheets—Sheet 1.

Witnesses:
Inventor,
Smith McGarvin
By Dewey Strong & Co.
Atty

No. 672,453. Patented Apr. 23, 1901.
S. McGARVIN.
FRUIT GRADING MACHINE.
(Application filed May 3, 1900.)
(No Model.) 2 Sheets—Sheet 2.
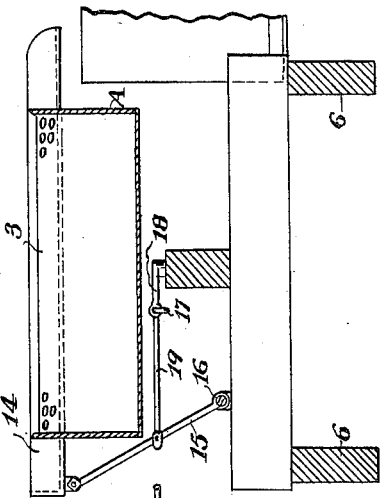
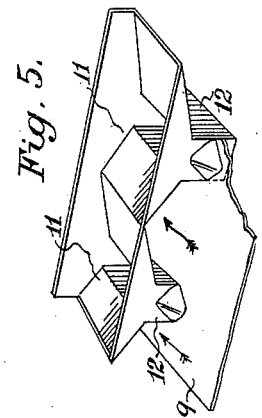
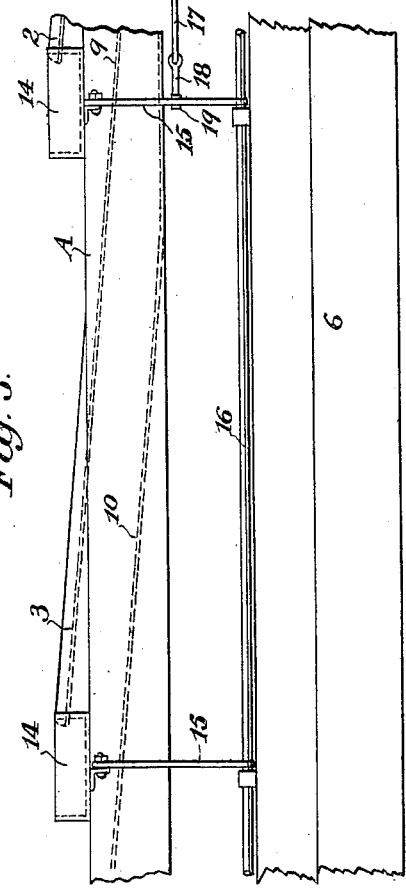
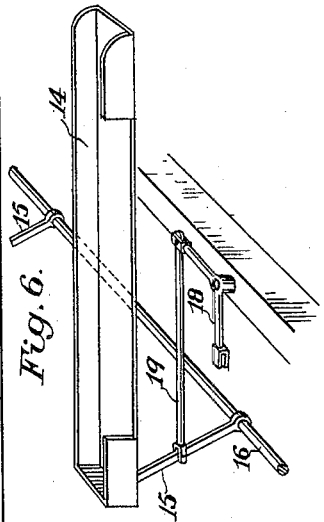
Witnesses,
E. S. Brandau
J. H. Nurse
Inventor,
Smith McGarvin
By Dewey Strong & Co.
Attys

UNITED STATES PATENT OFFICE.

SMITH McGARVIN, OF FRESNO, CALIFORNIA.

FRUIT-GRADING MACHINE.

SPECIFICATION forming part of Letters Patent No. 672,453, dated April 23, 1901.

Application filed May 3, 1900. Serial No. 15,354. (No model.)

*To all whom it may concern:*

Be it known that I, SMITH MCGARVIN, a citizen of the United States, residing at Fresno, county of Fresno, State of California, have invented an Improvement in Fruit-Grading Machines; and I hereby declare the following to be a full, clear, and exact description of the same.

My invention relates to a machine which is especially designed for grading fruit and separating it into different sizes for market or for other purposes.

It consists of a framework with inclined elastic arms by which it is supported and means by which a reciprocation is produced which causes a tossing and forward action of fruit which is placed upon screens contained within the framework. These screens are inclined and succeed each other in series, the largest openings being made in the first and the smallest in the last of the screens. Beneath each of the screens is a close receiving-plate, upon which the fruit passing through the screen is received and upon which it is transmitted to the next succeeding screen. In conjunction with these screens are discharge devices, upon which the fruit retained upon each screen is eventually delivered and discharged.

My invention also comprises details of construction, which will be more fully explained by reference to the accompanying drawings, in which—

Figure 1:
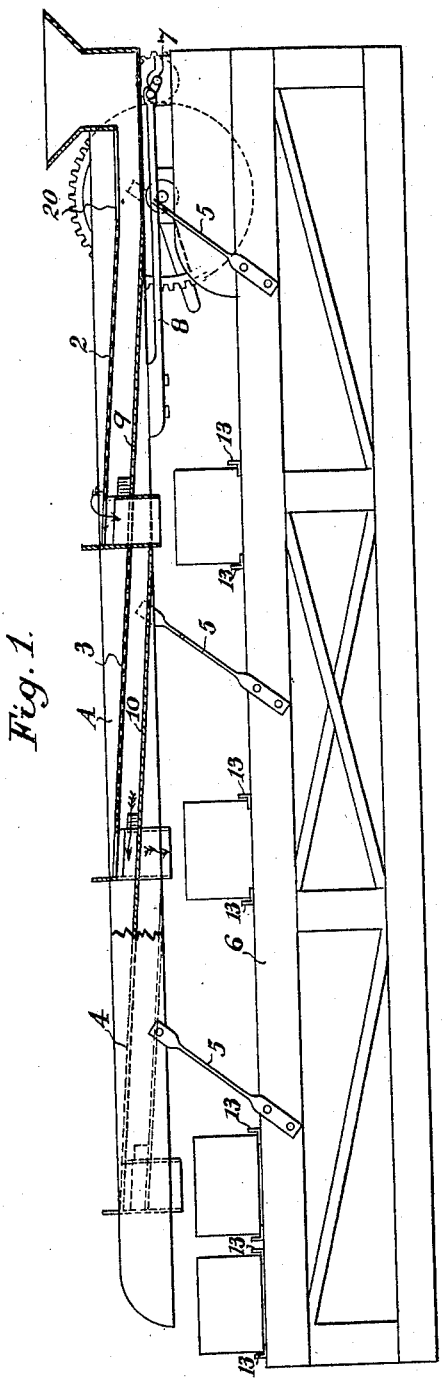
Figure 2:
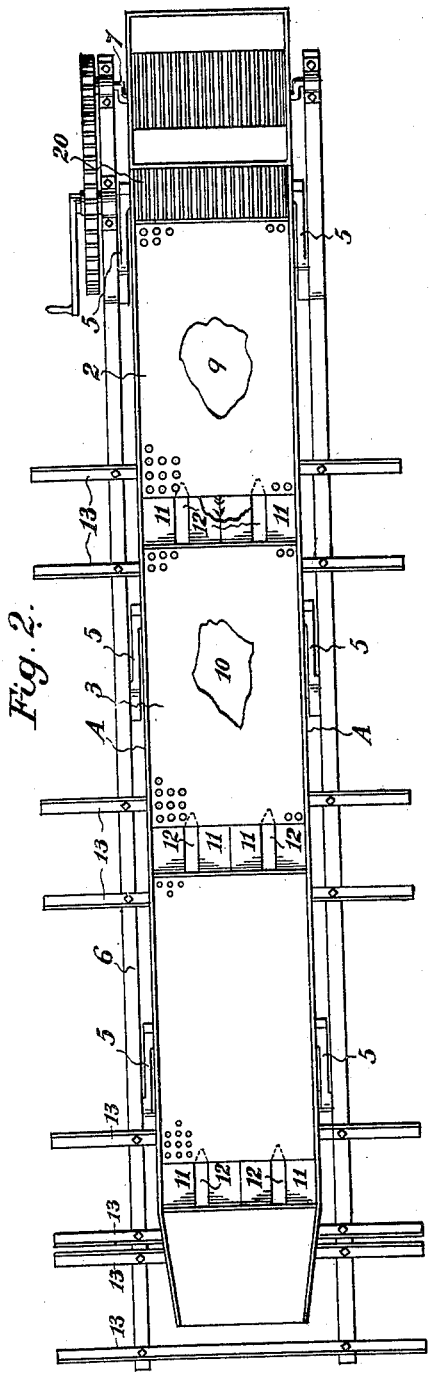

Figure 1 is a sectional elevation of my machine. Fig. 2 is a plan. Fig. 3 is an enlarged portion of a longitudinal elevation, showing a modification. Fig. 4 is a transverse view of the same. Fig. 5 is a detail of a hopper designed for use in hand-machines. Fig. 6 represents a transverse chute designed for use in a power-machine.

In the construction of fruit-grading machines it has been customary to so arrange the screens that the smallest fruit only may pass through the first screen, and the larger sizes pass successively through screens having larger openings until the largest fruit is finally disposed of at the end of the apparatus.

It is the object of my invention to separate the larger fruit from the smaller at the first part of the operation and the next size in the second part and so on, carrying only the smaller fruit to the end of the apparatus. This I effect by means of a series of screens 2, 3, and 4, mounted in a frame A at a suitable inclination. The frame A is supported upon elastic arms 5, which are fixed upon each side and incline at a considerable angle, as shown, the lower ends being fixed to a stationary supporting-frame 6.

7 is a shaft extending across the machine near one end and having cranks or eccentrics, and by means of connecting-rods 8 between said cranks or eccentrics and the frame A the latter is reciprocated whenever the shaft is rotated. This reciprocation, in conjunction with the inclined springs 5, causes a forward-and-upward motion of the frame A and the screens carried by it, and its return movement is a backward and downward one. The result of this movement is that any fruit carried upon the screens or any of the supporting-surfaces in the frame A will be thrown upward and forward at each impulse, while the fruit will not be returned by the backward movement of the surfaces on account of the angle of the supporting arms or springs, which causes the surfaces to be withdrawn, the inertia of the fruit maintaining it in its position, so that it is really advanced up the inclined screens 2 3 4 and the connecting-surfaces by each reciprocation.

The screen 2 is made of such size that all fruit but the very largest will pass through the perforations of the screen. Beneath this screen is a close surface 9, which receives all the fruit thus passing through, and the continued reciprocations of the frame, as previously described, will advance this fruit, as well as that upon the screen 2 above, toward the upper end. The screen 3 is in direct continuation with the surface 9, so that the fruit passes from this surface directly upon the screen 3, and there all fruit, except the largest remaining, will pass through and fall upon a second inclined floor 10, located beneath the screen 3. From this surface the fruit again passes forward upon the screen 4, which is a continuation of the surface 10, and this having again smaller openings will retain upon its surface the next larger grade of fruit, allowing the smaller to pass through. There may be as many of these continued surfaces and screens as will be necessary to provide for the desired separation of sizes.

The upper end of each of the screens 2, 3, and 4 delivers into transfer or carrying devices, which serve to remove the fruit to one side and deliver it into properly-placed boxes. I have here shown two methods for this transfer. In small hand-machines I have shown hoppers, as at 11, so placed that fruit delivered from the upper end of each screen will fall into these hoppers. There may be two or more of the hoppers occupying the width of the screen, so that the sides of the hoppers will have sufficient incline to cause the fruit to easily run to the apex, where it is discharged through chutes 12, which pass through the closed bottom just beneath and deliver the fruit into transverse chutes or into boxes which are supported upon guide-rails 13, so that they can be pushed beneath the hoppers, and as fast as one is filled it is moved along and another one substituted for it.

The second method, which is used in what are known as "power-machines," consists of transverse chutes 14, having the side adjacent to the screen cut away, so that the upper end of the screen will overlap and deliver into this chute. The opposite side and the rear end are sufficiently high to prevent any escape of fruit in this direction. These chutes are supported upon angularly-placed arms 15, the lower ends of which are connected with a longitudinally-disposed shaft 16, suitably journaled beneath the screen-frame.

17 is a longitudinally-disposed rod connecting with some portion of the apparatus by which a reciprocating motion is produced, and this rod connects with the bell-crank lever 18, the angle of which is fulcrumed. From the other arm of the lever a rod 19 extends and connects with one of the diagonally-supporting arms 15 of the chutes 14. By this construction it will be seen that the reciprocations of the screens and the surfaces below will separate out the fruit into its different sizes, and fruit thus separated will be advanced to the upper end of the respective screens and delivered into the chutes 14. The longitudinal reciprocation of the rod 17 is transformed by the bell-crank lever into a transverse reciprocation and tossing movement of the chute 14, which thus serves to gradually advance the fruit delivered into these chutes and deliver it into boxes which are placed beneath the open mouths of the chutes. The fruit is first delivered upon the screen 20, which is composed of longitudinally-disposed bars of such a mesh as will allow dirt, sticks, and small trash to escape, but will retain all the fruit, and the fruit after this preliminary cleaning passes upon the first screen, where, as before stated, the larger fruit is separated from all the rest and at once removed at the end of the screen. The advantage of this is that the smaller fruit will all find its way through the holes of this screen and will not ride upon the surface of the larger fruit, which would prevent a complete separation. In each successive screening the same advantage is observed, the result being, first, that the larger and better fruit is disposed of without being obliged to pass through a long series of screens and be subject to bruising or other unfavorable action which might occur, and experience has shown that the weight of the fruit thus disposed of in the upper part of the apparatus gives greater capacity and more rapid grading.

Having thus described my invention, what I claim as new, and desire to secure by Letters Patent, is—

1. The combination in a fruit-grader, of a frame in which are arranged inclined screens in parallel planes, an imperforated conveyer beneath, and parallel to, each screen and in the same plane with and a part of the succeeding screen, and means for horizontally reciprocating the frame and projecting the fruit through the machine contrary to the force of gravity.

2. The combination in a fruit-grader, of inclined parallel screens, horizontally disposed and with the openings in the mesh of the screens diminishing in succeeding screens, each screen having an imperforated feed-board in the same plane with it, and of which board this screen is a continuation, said feed-boards extending beneath and parallel to an immediately-preceding screen, and means for reciprocating these screens and feed-boards in unison whereby the fruit is projected through the machine contrary to the force of gravity.

3. In a fruit-grader, the combination of a series of inclined parallel screens of varying mesh, each screen having an imperforated feed-board integral and in the same plane with it, which feed-board receives the fruit through the screen immediately above it, means at the end of each screen whereby the varying grades of fruit segregated are discharged, and means for reciprocating these screens and their feed-boards, and the discharge-outlet horizontally and in unison, and projecting the fruit through the machine in a direction contrary to the force of gravity.

4. In a fruit-grader, the combination of a longitudinal frame having fixed therein inclined parallel screens, the mesh reducing in size from the first to the last screen, the screens having imperforated, similarly-inclined surfaces beneath upon which the fruit is received, said surfaces being continuous with and part of the next succeeding screen, means for horizontally reciprocating this frame and carrying the fruit upon the screens and imperforated surfaces through the machine in "up-hill" direction, a transverse discharge-chute at the end of each screen and above the imperforated surface and respective screen beneath, a longitudinal shaft having vertically-disposed arms upon which these transverse chutes are mounted, and means by which these chutes are reciprocated.

In witness whereof I have hereunto set my hand.

SMITH McGARVIN.

Witnesses:
 HERBERT F. BRIGGS,
 C. W. LUCKETT.